Figure 1:
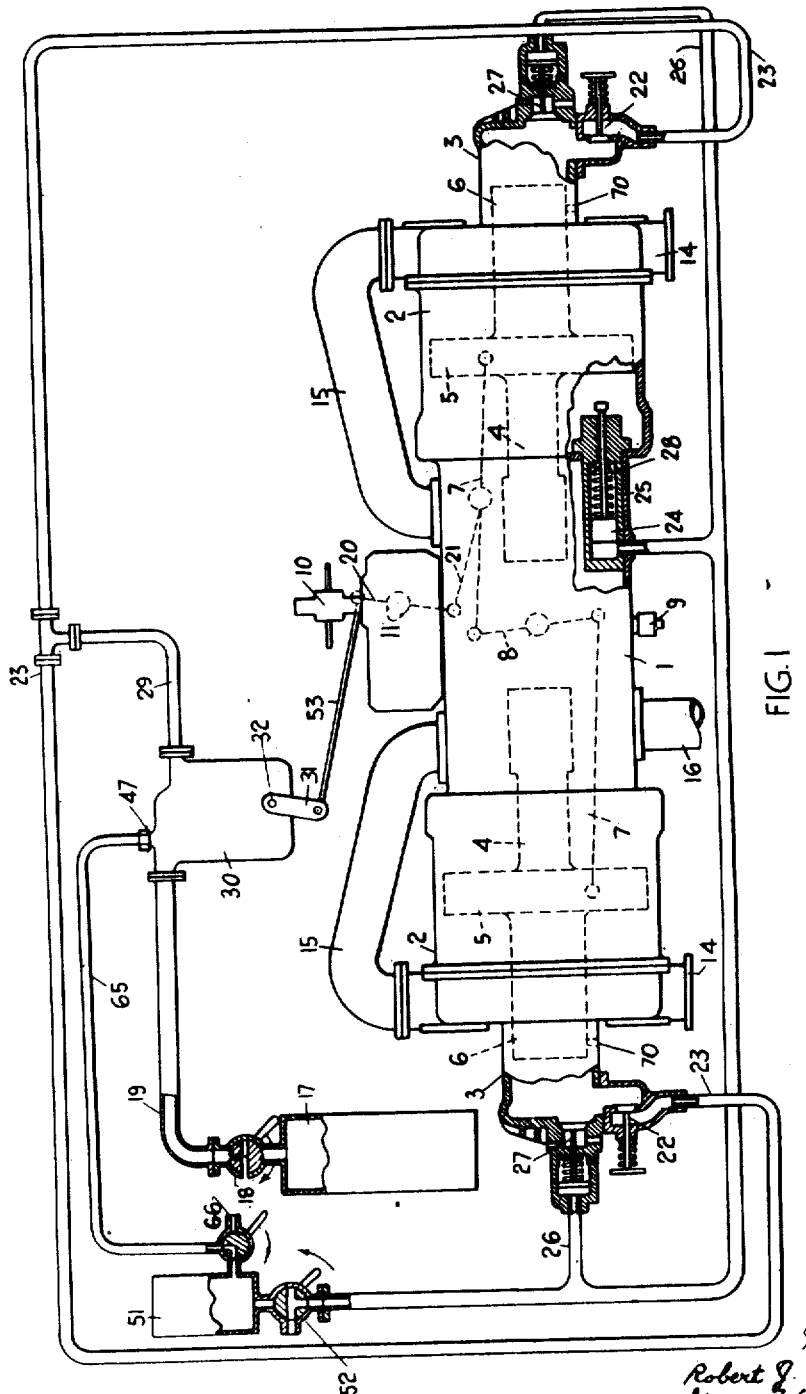

Inventors
Robert J. Welsh
George W. Cox
By Babcock & Babcock
Attorneys

Patented Jan. 20, 1948

2,434,877

UNITED STATES PATENT OFFICE 2,434,877

MEANS FOR STARTING FREE PISTON INTERNAL-COMBUSTION OPERATED COMPRESSORS OR GAS GENERATORS

Robert James Welsh and George William Cox, Rugby, England, assignors to The English Electric Company Limited, London, England, a British company Application October 23, 1944, Serial No. 559,976
In Great Britain May 31, 1943

9 Claims. (Cl. 230—56)

This invention relates to the starting of a reciprocating internal combustion engine of the so-called free piston type, i. e., a device in which an engine piston is directly connected to a reciprocating load—such as the piston of a compressor for air or other gases—which it drives without the intervention of cranks, crankshafts and connecting rods. Such an internal combustion engine-driven compressor may be used, for example, as a gas generator supplying motive fluid to a turbine or other prime mover. The invention employs gas pressure from a source of, for example, compressed air for starting the engine, this gas—hereinafter referred to as air—being admitted either to an auxiliary starting cylinder or to a cylinder serving some other function during normal operation of the engine. A free piston type compressor or gas generator as defined above is usually made up of an engine cylinder, a compressor cylinder and a separate buffer cylinder in which reciprocates some part of the piston unit for compressing air during the expansion stroke of the engine, the pressure of which air serves to return or to assist in the return of the engine piston and the compression of a fresh charge in readiness for the next expansion stroke.

The engine may be started by supplying compressed air to the compressor cylinder or—as is known—to the buffer cylinder and it is necessary that this supply of air—or indeed the application of air in any other way for starting the engine—should not interfere with subsequent normal operation.

The aim of the present invention is to provide for a very smooth, easy starting of a free piston internal combustion operated compressor or gas generator in such manner as not to interfere with subsequent normal operation, the starting energy imparted to the piston being moreover not fixed and predetermined but varied in accordance with the starting requirements.

According to the primary feature of the invention, means are provided for admitting air to a cylinder in a number of separate impulses whereby the free piston unit is reciprocated with a gradually increasing amplitude until it reaches its full stroke; thereupon, the fuel supply is started and the air supply cut off. The starting air will escape from the cylinder in the usual way at the end of a full stroke through a port uncovered by the piston when near its inner dead centre position.

The free piston may be set near to, but a definite amount short of, its outer dead centre position in readiness for starting.

The invention is illustrated by the accompanying drawings of which—

Figure 2:
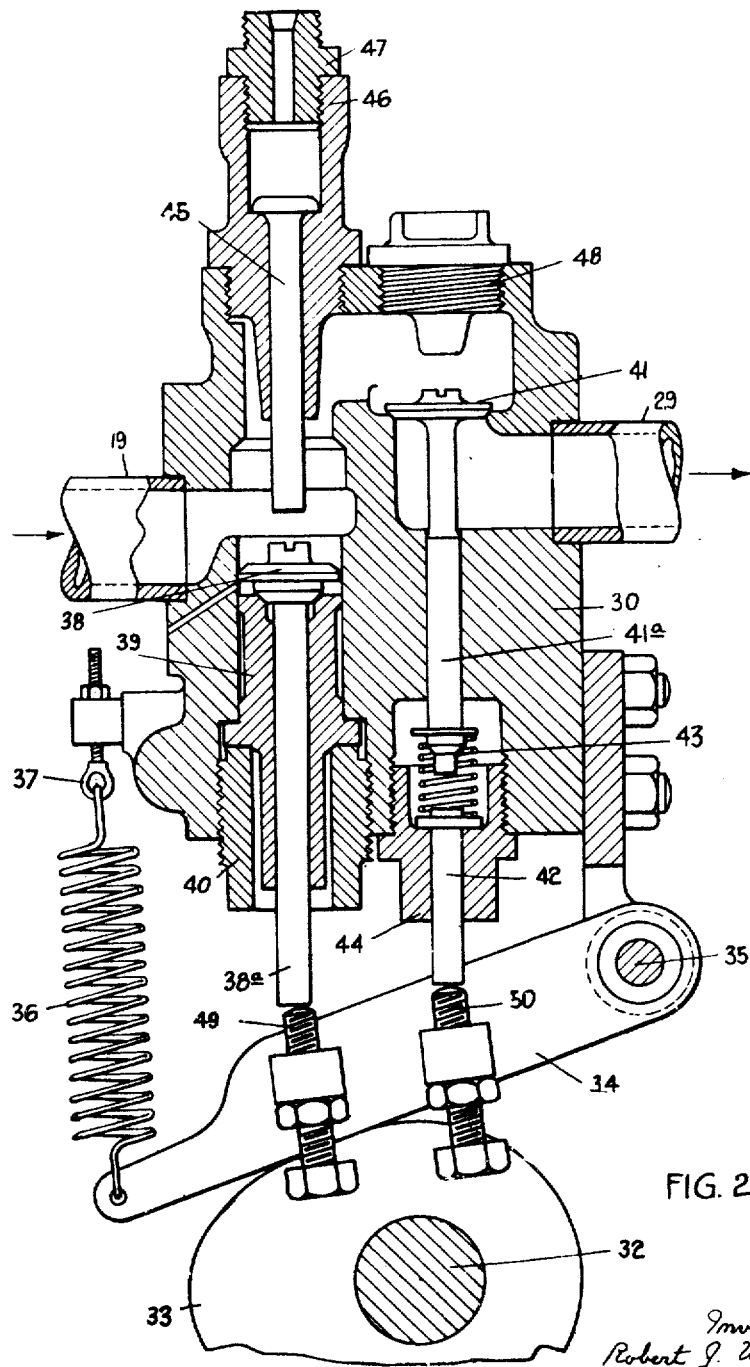
Figure 4:
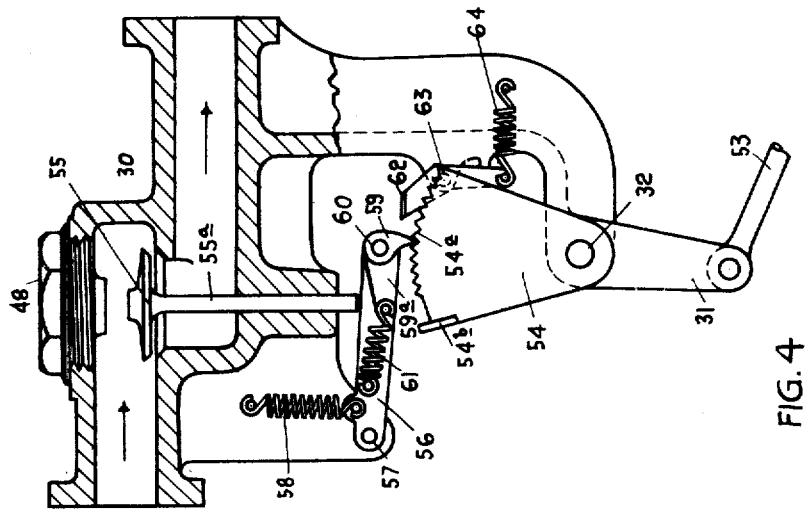

Fig. 1 is a general view of a free-piston type internal combustion compressor with starting arrangements according to the invention, Fig. 2 is a sectional view of one form of the starting regulator shown in outline in Fig. 1, and Figs. 3–8 are sectional views of an alternative form of starting regulator in different operational positions.

In Fig. 1 the body of the free piston type internal combustion engine-compressor comprises the engine cylinder 1, the pair of compressor cylinders 2 at opposite ends thereof and the pair of buffer cylinders 3 at the extreme outer ends; each free piston unit consists of one of the opposed engine pistons 4 reciprocating in the cylinder 1, a compressor piston 5 reciprocating in one of the cylinders 2 and a buffer piston 6 reciprocating in one of the cylinders 3. The air can enter the compressor by the suction inlet 14; compressed air from the compressor can go by way of the scavenging conduits 15 to the engine cylinder which exhausts through the exhaust conduit 16.

The reciprocating piston units are synchronised in well known and usual manner by being linked by the pair of links 7 to the opposite ends of the lever 8 having its mid point pivotally supported on the outside part of the engine cylinder 1.

Fuel can be injected into the cylinder 1 by one or more fuel injectors such as 9 of conventional form and from the fuel injection pump 10 also of conventional form reciprocated by cam 11 which is oscillated (in accordance with the movement of the free piston units) by lever 20 which is connected by link 21 to a point on one of the links 7.

Each buffer cylinder 3 is provided with an opening controlled by the non-return valve 22 forming an inlet valve through which compressed air can be admitted from the source of supply 17 through the master starting valve 18, pipe 19, starting regulator 30 (to be described in detail hereinafter), pipe 29 and pipe 23 for starting the engine. In addition, each buffer cylinder has a vent governed by the compression relief valve 27 which can be opened by the application of fluid pressure from the source of pressure 51 through the two-way valve 52 and the pipe 26.

A barring piston 24 movable in the cylinder 25 is provided for moving the opposed pistons apart, each to a point near to but a definite amount short of its outer dead centre position; the pistons are each left at this point ready for starting. The piston 24 is moved against the force of the spring 28 by the pressure in the said pipe 26.

The starting regulator 30 has an operating spindle 32 oscillated by the lever 31 which is secured thereto and which is connected by the link 53 to the previously mentioned lever 20 whereby the spindle 32 is oscillated in accordance with the motion of the free piston units.

In the construction of starting regulator 30 shown in Fig. 2, a cam 33 secured to the spindle 32 can oscillate the tappet-arm 34 about fixed pivot 35 carried by the body of the regulator device. This arm 34 is drawn away from the cam 33 by the tension spring 36 connected between one end of the arm and the hook 37 attached to the body of the device 30, except when the arm is held in engagement with the cam 33 against the force of spring 36 by the action of the air pressure on the valves, forming the essential parts of the regulator. These valves comprise an initially open cut-off valve 38 having valve stem 38a slidable in and projecting from the valve guide 39 held in the body of device 30 by the tubular nut 40 and an initially open intermittent valve 41 having a stem 41a slidable within the body of the device 30. This valve 41 also includes the auxiliary stem 42 slidable through the guide 44 screwed into the body of the device 30; the auxiliary stem has one end projecting from the guide 44 and the other end formed with a head complementary to a similar head on the main valve stem 41a, the spring 43 being compressed between these two heads. The tappet-arm 34 carries adjustable tappet screws 49 and 50 for engaging the ends of the stems 38a and 42 respectively.

The device also includes a closure cap 48 for the body of device 30 serving also as a stop for valve 41 and a resetting plunger 45 for cut-off valve 38, which plunger is slidable through the guide 46 screwed into the body of device 30 under the action of fluid pressure applied through the inlet member 47.

The operation is as follows:

At some time prior to the starting of the free piston engine the valve 52 is operated to connect pipe 26 to source of pressure 51, thus causing the venting valves 27 to open and the barring device to set the pistons in the correct position for starting; valve 52 is then reclosed to disconnect pipe 26 from source 51 and open the pipe to exhaust, which permits valves 27 to close and spring 28 to retract the barring piston 24. In order to start the free piston engine, the master starting valve 18 is opened so that compressed air from the source 17 is admitted through pipe 19 to the body of the starting regulator 30. This air passes unhindered by the cut-off valve 38. A small quantity of it passes the intermittent valve 41 to the cylinders 3 by way of pipes 29 and 23 and valves 22 but the air pressure moves each free piston unit 4—5—6 towards its inner dead centre position, moving cam 33, lever 34, and screw 50, thereby allowing the air pressure to close the intermittent valve 41, moving stems 41a and 42 outwards. In this way a small puff of air is admitted to the cylinders 3, imparting only a small inward movement to the free piston units, which latter will then rebound. On the rebound, the cam 33 will again open the intermittent valve 41 (through the lever 34, screw 50, stem 42, spring 43 and stem 41a) and a second puff of air will thus be admitted to the cylinders 3, thereby causing another oscillation of the free piston units of higher amplitude. This action continues until the amplitude of each free piston unit is such that the unit approaches the inner dead centre when cam 11 operates fuel pump 10 to supply fuel to the engine cylinder 1 whereby the engine starts. After the engine is started, the amplitude of movement of the free piston units will be increased towards the outer dead centre position; this movement causes cam 33, acting through lever 34, screw 49 and stem 38a, to close the cut-off valve 38 when each piston unit is near the end of an outward stroke of full operational length. The cut-off valve 38 snaps over to and remains in the closed position so that the air from pipe 19 is cut off from intermittent valve 41 and pipe 29; there is now no pressure exerted on screws 49 and 50 by stems 38a and 42—hence the tappet-lever 34 is withdrawn from contact with the cam 33 by spring 36 and remains unaffected by subsequent operation of the free piston device. Valve 41 is thus held open.

The snap action can conveniently be imparted to the cut-off valve 38 by the air pressure. Thus the valve 38 is in the form of a disc which when in the open position is withdrawn into a recess out of the path of the air coming in by pipe 19 and in which recess, of course, the air pressure tends to keep valve 38. By the action of the cam and tappet mechanism, the disc is eventually moved into the stream of air so as to enter a recessed seating where it obstructs passage of the air to the intermittent valve 41. The pressure of the incoming air will then snap the valve 38 onto and hold it on this seating.

Subsequently the master starting valve 18 is closed and later fluid pressure is applied through inlet 47 to tappet 45 for re-opening the cut-off valve 38 in readiness for restarting. The inlet 47 can be connected first to the source of fluid pressure 51 and then to exhaust through pipe 65 and two-way valve 66.

If the intermittent valve 41 were actuated solidly by the tappet-lever 34, this valve 41 would open during the outward stroke when the free piston is at a certain distance from the point at which this piston comes to rest and will reclose during the impulse stroke at the same distance from the latter point. Air—acting in opposition to the motion of the piston unit—will thus be admitted to the cylinders 3 over the same length of the return stroke of each oscillation as of the impulse stroke. Preferably, there should be a longer opening to the air pressure on the impulse stroke than on the return stroke and so preferably provision is made so that the point at which the intermittent valve 41 opens is much nearer to the outer end of the free piston stroke than is the point at which the intermittent valve 41 closes. This is achieved by the combination of two features. Firstly, the intermittent valve 41 is arranged to move off its seat in the opposite direction to the motion of the incoming air in such manner that the air pressure tends to reclose the valve with a force increasing as the valve closes and, secondly, the valve is driven by the lever 34 through a spring and lost motion device. For the latter purpose the valve stem is in the two parts 41a and 42, the latter being adapted to drive the former through spring 43. During the impulse stroke, the movement of the free piston units and cam 33 allows stem 42 to move to decrease the pressure of spring 43 until—after a certain movement of the free pistons—the air pressure closes the intermittent valve 41. On the return stroke, the cam 33 drives the stem 42 (through lever 34) and stresses the spring 43 but it is not until the spring pressure has built up a high value or until the full lost motion between the stems 42 and 41a has been taken up and stem 42 is solidly driving the valve 41 that sufficient force is exerted to open the intermittent valve 41 against the now considerable closing force due to the air pressure; thus the intermittent valve 41 is not re-opened until the piston has almost come to rest at the outer end of its stroke.

In the modified construction of starting regulator according to Figs. 3–8, there is secured to the spindle 32 in place of the cam 33 of Fig. 2 the ratchet sector 54 (which is accordingly oscillated by the motion of lever 31 in accordance with movement of the free piston units), the arcuate surface of this sector 54 being of ratchet or serrated form as indicated at 54a. One end thereof also carries the projection 54b serving a purpose to be hereinafter described. Within the body of the device 30 is the intermittent and cut-off valve 55 having a valve stem 55a slidable through and projecting outside the body where it engages the valve actuating lever 56 pivoted on the body of the device at 57 and biassed by spring 58 in a direction to hold the valve 55 open against the previously mentioned combined closure cap and stop 48. A pawl 59 carried on pivot pin 60 at the end of the valve lever 56 is biassed to a mid position by the centering spring 61 connected at one end to the lever 56 and at the other to a tail 59a projecting from the pawl 59.

Pivotally mounted on an extension of the body of device 30 is a latch 62 turning about pivot pin 63 under the action of biassing spring 64. This latch is so positioned relatively to the pawl 59 that when the tail 59a of the latter is engaged by the projection 54b (Fig. 8) it can momentarily move the latch 62 against the force of spring 64 until the latch snaps under the pawl 59 holding it clear of the ratchet sector.

Figure 3:
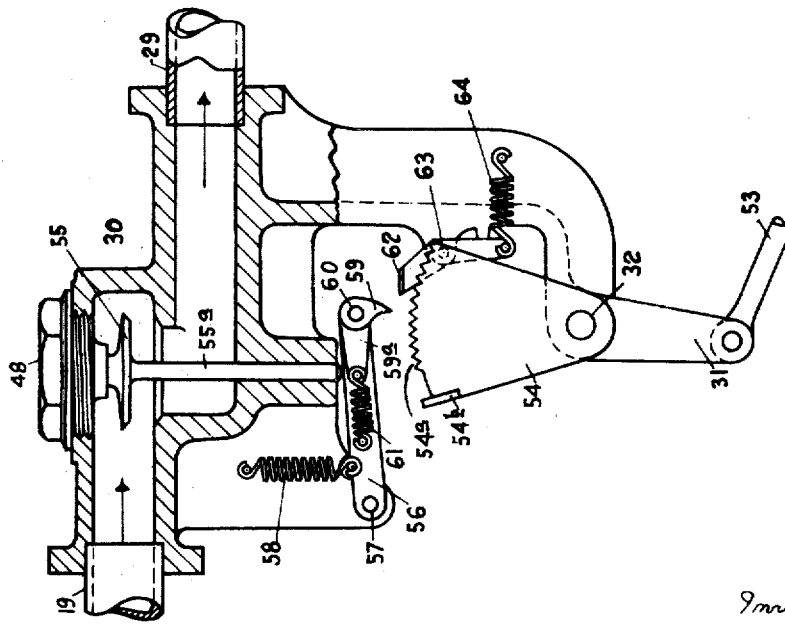
Figure 6:
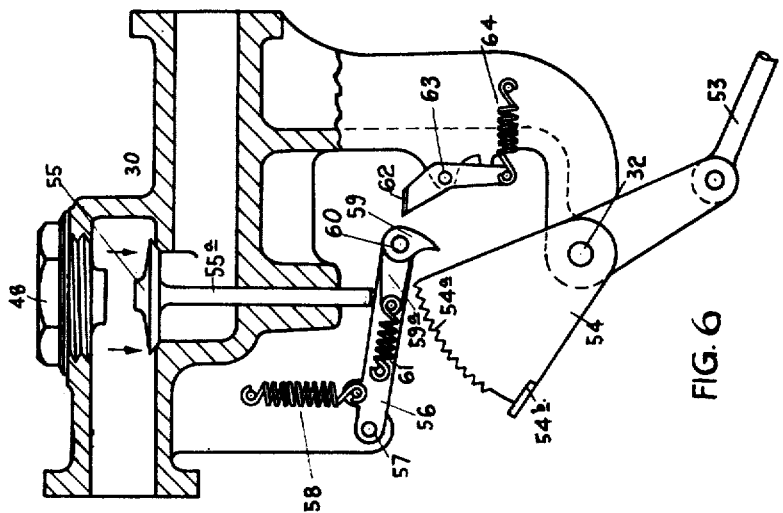
Figure 5:
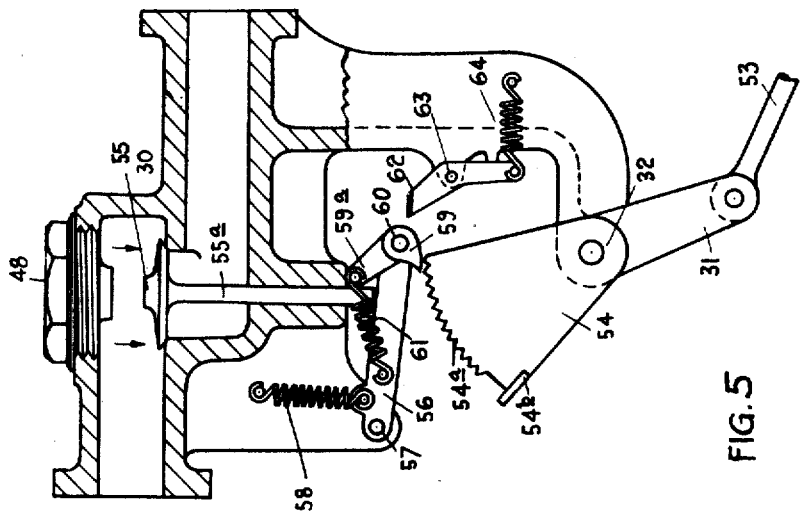
Figure 8:
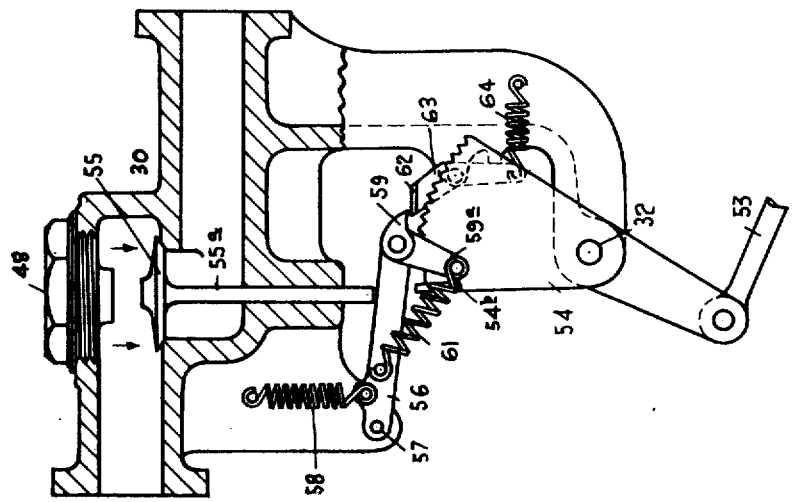
Figure 7:
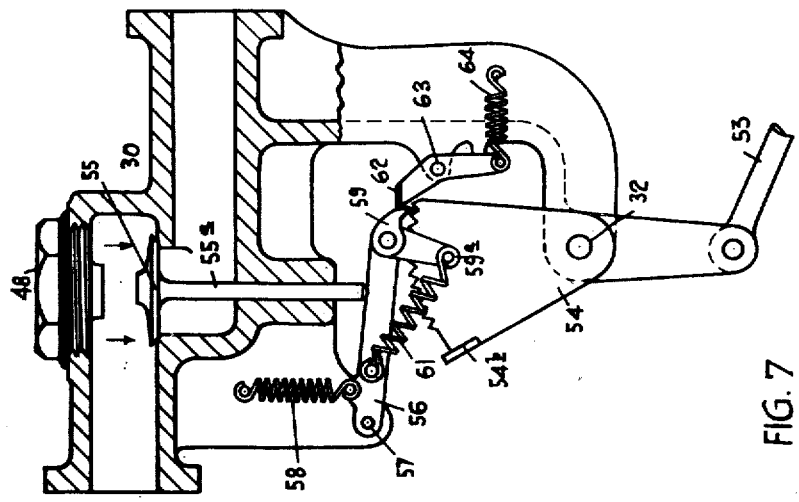

When the free piston internal-combustion compressor is to be started, the regular device is as shown in Fig. 3. The operation is as already described with reference to Figs. 1 and 2 up to the point at which air is admitted by way of the pipe 19 to the body of the regulator 30, the air pressure moving the valve 55 downwards to the position shown in Fig. 4, the engagement of the pawl 59 with the part 54a of the ratchet sector 54 preventing complete closure of the valve 55. Air is accordingly admitted to cylinders 3. The subsequent operation is as follows:

The resulting free piston movement moves the ratchet sector 54 to, or towards, the position shown in Fig. 5. This—due to the engagement of the tip of the pawl 59 with one of the teeth or serrations 54a in the ratchet sector 54—will rock the pawl 59 against the biassing force of spring 61 away from its mid position until after a certain movement it reaches such a position that the valve 55 and valve lever 56 are free to move under the action of the air pressure on valve 55 to a position in which the valve is closed, as in Fig. 5, cutting off the air supply. The quantity of air supplied is thus limited to a small puff. Further free piston movement arising from the expansion of the starting air in cylinder 3 will, before the free pistons have reached their inner dead centre positon, allow the end of the ratchet sector 54 to pass clear of the pawl 59 as in Fig. 6, allowing the pawl to return to its mid position, the valve 55, however, remaining closed. The puff of air thus admitted to the cylinders 3, 3 imparts a movement to the free piston unit which latter will then rebound. During the return stroke, the end of the ratchet sector 54 will engage the pawl 59, moving it to the other side of its mid position, still leaving the valve 55 closed, and the pawl 59 will trail over the surface of the sector as in Fig. 7. At the end of the rebound, the free piston units will still oscillate and there will therefore be a slight movement again towards the inner dead centre position. Due to the engagement of the pawl with the serrated surface of the sector, the pawl will be immediately moved towards its mid position, this movement acting on the valve lever 56 to re-open the valve 55. A second puff of air will thus be admitted to the cylinders 3 causing another oscillation of higher amplitude, the valve 55 remaining open until the same point is reached as before at which the pawl 59 is rocked over to a position in which the valve 55 recloses. This action continues until the amplitude of the free piston units is such that the inner dead centre is approached, whereupon the cam 11 operates the fuel pump 10 whereby the engine starts.

Up to this point the free piston units have been oscillating without reaching either the inner or the outer dead centre position. At the point now reached the pistons have, however, reached the inner dead centre position and the fuel supply has been commenced. The resulting combustion stroke will now move the pistons out to the outer dead centre position. This will cause the hitherto ineffective part 54b of the ratchet sector 54 to effect the engaging of the pawl 59 by the catch 62 so that thereafter with the valve 55 closed the pawl 59 is latched out of the way of the ratchet sector 54. On subsequent cutting off of the air supply by reclosing of the master starting valve 18, the absence of air pressure will allow the spring 58 to move lever 56 to re-open the valve 55, (such re-opening being otherwise ineffective) the pawl 59 then becoming disengaged from the catch 62 but moving with the valve lever 56 out of the way of the ratchet sector 54, the whole device being then reset ready for the next starting operation.

It will be understood that the starting air admitted to the buffer cylinders 3 or other cylinder will escape therefrom in the usual way through ports 70 uncovered by the piston when near its inner dead centre position so that such air has no effect on the operation of the engine once it has started.

What we claim as our invention and desire to secure by Letters Patent is:

1. In combination, a free piston internal combustion operated compressor or gas generator and starting means therefor, comprising an internal combustion cylinder, at least one compressor cylinder, at least one buffer cylinder, and at least one free piston assembly comprising an internal combustion piston, a compressor piston and a buffer piston adapted to reciprocate as one unit in said cylinders, means for moving said free piston assembly to a position for starting, an air venting valve in said buffer cylinder adapted to be opened to atmosphere while moving the free piston assembly to said starting position, an unrestricted source of compressed starting air in supply connection with said buffer cylinder and, interposed between said buffer cylinder and said source of air, a non-return valve and a starting air regulator operatively connected with and adapted ot be alternatingly opened and closed by the reciprocating free piston assembly during the starting period to give an intermittent access of starting air to the said buffer cylinder each time the free piston assembly approaches an outer reversal point, and fuel injection means adapted to inject fuel into said combustion cylinder only when a predetermined amplitude of said outer reversal points is obtained.

2. In a starting air regulator for a free piston internal combustion operated compressor or gas generator as claimed in claim 1, the combination of an air valve casing, an air cut-off valve, an intermittent air valve, an auxiliary valve stem in axial alignment with said intermittent valve, resilient means interposed between said auxiliary valve stem and said intermittent valve, a tappet lever carrying adjusting means arranged to be in contact with said cut-off valve stem and said auxiliary valve stem and biased by resilient means to a position in which the said cut-off valve is moved to its closed position and the said intermittent valve is moved towards its open position when the supply of compressed starting air is shut off at its source.

3. In a starting air regulator for a free piston internal combustion operated compressor or gas generator as claimed in claim 1, the combination of an air valve casing, an air cut-off valve, an intermittent air valve, an auxiliary valve stem with resilient means between said auxiliary valve stem and said intermittent valve, an adjustable tappet lever for operating said cut-off valve and said intermittent valve and resilient means for biassing said cut-off valve towards its closed position and said intermittent valve towards its open position respectively when the source of compressed starting air is shut off and a cam operatively connected to the reciprocable free piston assembly in such relation that the air cut-off valve and intermittent air valve are moved against the pressure of the compressed starting air supply as the free piston assembly reaches a point near the end of its travel during the outward stroke.

4. In a starting air regulator for a free piston internal combustion operated compressor or gas generator as claimed in claim 1, the combination of an air valve casing, an air cut-off valve, an intermittent air valve, an auxiliary valve stem in axial alignment with said intermittent air valve, mechanical means arranged to move the said auxiliary valve stem in the direction of its axis and resilient means interposed between said intermittent air valve and said auxiliary valve stem adapted to delay the opening of the said intermittent air valve against starting air pressure when the auxiliary valve stem is moved by said mechanical means towards the said intermittent air valve.

5. In a starting air regulator for a free piston internal combustion operated compressor or gas generator as claimed in claim 1, the combination of an air valve casing, an air cut-off valve, an intermittent air valve, an auxiliary valve stem in axial alignment with said intermittent air valve, resilient means interposed between said intermittent air valve and said auxiliary valve stem, an adjustable tappet lever arranged for operating said valves and biased by resilient means to move said cut-off valve towards its closed position and said intermittent valve towards its open position when the starting air source is shut off, a cam operatively connected to the reciprocable parts of the free piston assembly and a disc forming an integral part of the said air cut-off valve, said disc being shielded against the flow of starting air when the amplitude of the oscillation of the free piston assembly is small but moved into the said flow when the amplitude of the said oscillation is large and thereby being adapted to close rapidly and remain closed under the action of the starting air pressure.

6. In a starting air regulator for a free piston internal combustion operated compressor or gas generator as claimed in claim 1, the combination of an air valve casing, an air cut-off valve shielded from the air flow in its open position, an intermittent air valve, an auxiliary valve stem in axial alignment with said intermittent air valve, resilient means interposed between said intermittent air valve and said auxiliary valve stem, an adjustable tappet member for operating said valves, a cam operatively connected to the reciprocable parts of the free piston assembly and a tappet in axial alignment with the said cut-off valve and fluid pressure means adapted to move said tappet to open said cut-off valve when the source of starting air pressure is shut off and to reset the cut-off valve to its open and shielded position.

7. In a starting air regulator for a free piston internal combustion operated compressor or gas generator as claimed in claim 1, the combination of an air valve casing, an air cut-off valve which is shielded from the air flow in its open position, an intermittent air valve, an adjustable tappet lever for operating said valves, a cam operatively connected to the reciprocable parts of the free piston assembly and adapted to oscillate said tappet lever and operate said valves in accordance with the time period and magnitude of the reciprocation of the free pistons such that starting air is intermittently admitted to the buffer cylinders in a manner that impulses are imparted successively to the free piston assembly in increasing magnitude as the amplitude of oscillation of the free pistons increases until the said cut-off valve is moved beyond its shielded position into the flow of the starting air and under the influence of said flow is caused to close rapidly and cut off the source of supply of said starting air to said intermittent air valve.

8. In a starting air regulator for a free piston internal combustion operated compressor or gas generator as claimed in claim 1, the combination of a valve casing in supply connection with the said unrestricted source of compressed air supply, a movable valve member so positioned in said casing that the compressed air tends to close the valve, a lever pivotally mounted on said casing and biased by resilient means to co-operate with said valve and to urge it towards its open position, a pawl movable with, but pivotally mounted with respect to the said lever, and biased by resilient means to a mid-position, a movable ratchet member operably interconnected to the reciprocable parts of the free piston assembly and adapted to oscillate in accordance with the time period and magnitude of the oscillations of the said free piston assembly, said ratchet member having a range of positions obstructing the movement of the said pawl in the valve-closing direction when the free piston assembly is near its outer dead point, and another position, in which the ratchet is clear of the pawl, when the free piston assembly is near its inner dead point.

9. In a starting air regulator for a free piston internal combustion operated compressor or gas generator as claimed in claim 1, the combination of a valve casing, a movable valve member so positioned in said casing that compressed air supplied to the casing tends to close the valve, a lever pivotally mounted on said casing and biassed by resilient means to co-operate with said valve and urge it towards its open position, a pawl movable with but pivotally mounted with respect to the said lever and biassed by resilient means to a mid-position, a movable ratchet member operatively connected to the reciprocable parts of the free piston assembly and adapted to oscillate in accordance with the movement of the said free piston assembly, said ratchet member having a range of positions obstructing the movement of the said pawl in the valve-closing direction and another position in which the ratchet is clear of the pawl, a latch positioned to hold said pawl entirely free from said ratchet and a projection on said ratchet for moving said pawl into the latched position when the free piston assembly reaches a point in its stroke corresponding to its outer dead point position while running normally under the influence of its fuel injection means.

ROBERT JAMES WELSH.
GEORGE WILLIAM COX.

REFERENCES CITED

The following references are of record in the file of this patent:

UNITED STATES PATENTS

| Number | Name | Date |
|---|---|---|
| 908,033 | Peterson | Dec. 29, 1908 |

FOREIGN PATENTS

| Number | Country | Date |
|---|---|---|
| 449,263 | France | Dec. 19, 1912 |